United States Patent [19]

Koch et al.

[11] 4,124,559

[45] Nov. 7, 1978

[54] COMPACTION OF PULVERIZED RUBBER MIXTURES

[75] Inventors: Heinrich Koch, Siegburg; Josef Lehnen, Leverkusen, both of Germany

[73] Assignee: Bayer Aktiengesellschaft, Leverkusen, Germany

[21] Appl. No.: 786,471

[22] Filed: Apr. 11, 1977

Related U.S. Application Data

[63] Continuation-in-part of Ser. No. 622,237, Oct. 14, 1975.

[30] Foreign Application Priority Data

Apr. 15, 1976 [DE] Fed. Rep. of Germany ....... 2616666

[51] Int. Cl.$^2$ ................................................. C08K 5/01
[52] U.S. Cl. .......................... 260/33.6 AQ; 260/42.47; 260/761; 260/763; 260/765
[58] Field of Search ............... 260/33.6 AQ; 259/191, 259/192

[56] References Cited

U.S. PATENT DOCUMENTS

| | | | |
|---|---|---|---|
| 3,654,218 | 4/1972 | Clas et al. .......................... | 260/42.55 |
| 3,797,702 | 3/1974 | Robertson .......................... | 259/191 |
| 3,799,510 | 3/1974 | Schott ................................. | 259/191 |
| 3,846,365 | 11/1974 | Berg et al. ..................... | 260/33.6 AQ |
| 3,888,997 | 6/1975 | Guibert ............................... | 259/191 |
| 3,895,035 | 7/1975 | Berg et al. ..................... | 260/33.6 AQ |
| 3,923,707 | 12/1975 | Berg et al. ........................... | 260/34.2 |
| 4,032,501 | 6/1977 | Schulz ........................ | 260/33.6 AQ |

OTHER PUBLICATIONS

Perry—Chemical Engineers' Handbook (5th ed.) (McGraw-Hill) (N.Y.) (1973) pp. 8-58 to 8-61.

*Primary Examiner*—Lewis T. Jacobs
*Attorney, Agent, or Firm*—Connolly and Hutz

[57] ABSTRACT

Compacting of a rubber mixture by forcing a vulcanisable mixture of rubber and additives required for its manufacture through a diminishing cross-section. The mixture includes a vulcanising medium and is in the form of a pourable powder having a particle size of 0.1 to 6 mm with a powder density of 0.4 to 0.8 g/cm$^3$. Compacting is at a temperature of 0° to 60° C, so that a granular, compact, yet not completely homogeneous, mixture of a density of 1.1 to 1.4 g/cm$^3$ is produced. A device for compacting is also shown.

1 Claim, 3 Drawing Figures

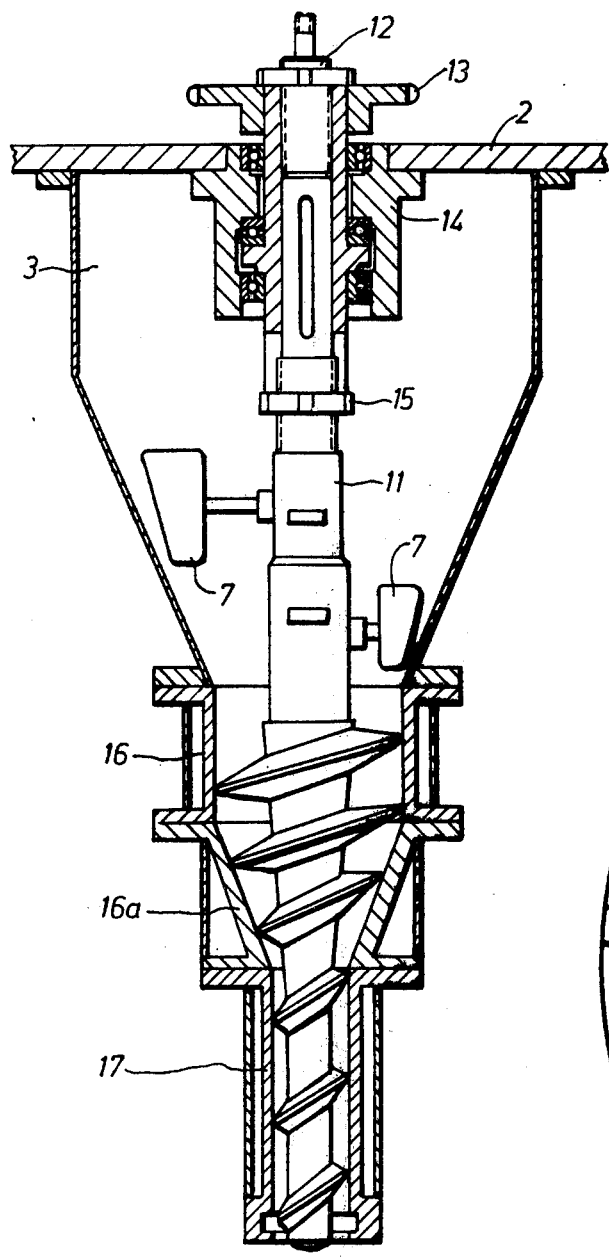
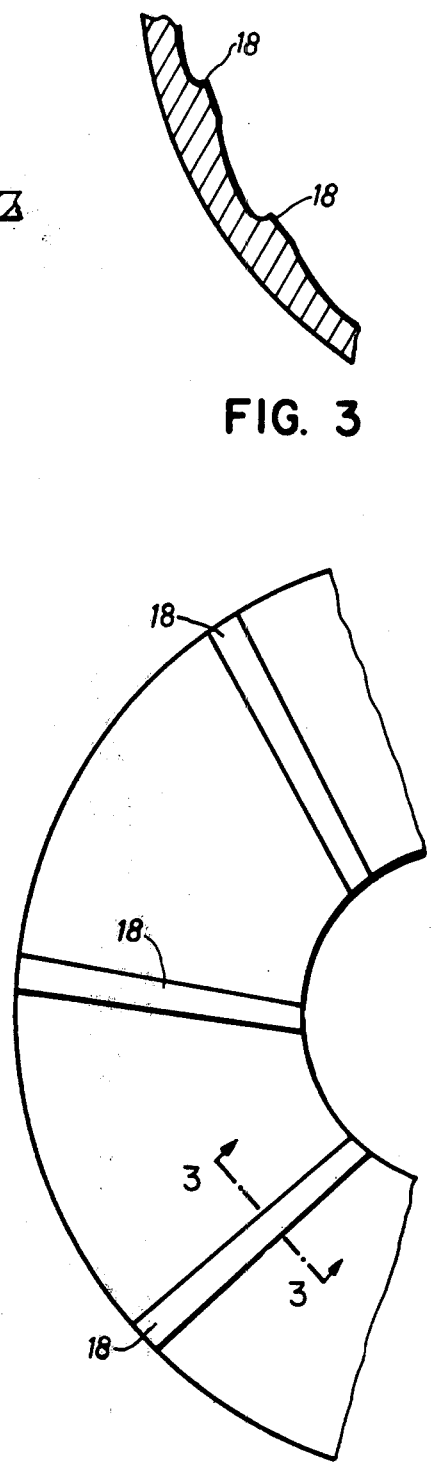

COMPACTION OF PULVERIZED RUBBER MIXTURES

CROSS REFERENCE TO RELATED APPLICATIONS

This application is a continuation-in-part of copending application Ser. No. 622,237, filed Oct. 14, 1975 by the same inventors.

The present invention relates to a method for the compaction of a powder form vulcanisable rubber mixture.

The term rubber mixture usually means a mixture of a vulcanisable rubber and the additives required for processing it, such as fillers, vulcanising medium, stabilisers.

For some time now such rubber mixtures have been available in the form of pourable powders, whereas previously the manufacturer of rubber articles had to produce them on the spot by expensive mixing processes.

Rubber mixtures in the form of pourable powders thus contain all the constituents required for making rubber articles. They can be processed without the addition of further substances. Pulverised rubber mixtures generally consist of particles with diameters of 0.1 to 6 mm. As rubber they preferably contain natural rubber, diene rubbers such as polybutadiene, polyisoprene, butadiene/styrene-copolymer, butadiene/alkylacrylate-copolymer, butadiene-acrylonitrile-copolymer (nitrile rubber) and polychloroprene or ethylene-propylene-diene rubbers (EPDM rubbers; the diene is generally not conjugated). Mixes of specific rubbers with thermoplastics are equally suitable, insofar as the mixes still have the characteristics of rubber (e.g. mixes of polyvinylchloride and butadiene/acrylonitrile-copolymers.)

The mixtures contain solid and, if necessary, liquid additives. Solid additives include for example (figures in brackets are parts by weight per 100 parts by weight rubber) carbon black (2–200), light fillers such as chalk, silicate (5–2000), vulcanising media (1–10) and vulcanising aids (sulphur, zinc oxide, accelerator), anti-ageing media, ozone protecting media, resinous substances and processing aids.

Liquid additives include in particular softening oils and stretching oils (5–170) and resinous substances (5–20), e.g. phenolic resins, which are usually added dissolved in oil.

These types of rubber mixtures in powder form are easily transported and metered on account of their pourability. Their powder density is usually 0.4 to 0.8 g/cm$^3$.

For processing, i.e. for manufacturing moulded bodies and subsequent vulcanisation, the pulverised mixtures must be compacted so that they can be fed into the normal rubber processing machines. It is impossible to make a homogeneous, for example extruded, moulded body directly from the pulverised rubber mixture but a granular but compact intermediate condition must be obtained first. The object of the invention is to produce this granular, compact, not completely homogeneous condition, without loss in the quality of the rubber, in particular without vulcanisation.

According to the invention there is provided a method for the compaction of a vulcanisable rubber mixture consisting of rubber and additives including a vulcanising medium in the form of a pourable powder having a particle size of from 0.1 to 6 mm and a density of from 0.4 to 0.8 g/cm$^3$, wherein the mixture is passed through a continuously decreasing cross-section at a temperature of from 0° to 60° C., whereby a granular, compact, yet not completely homogeneous mixture having a density of from 1.1 to 1.4 g/cm$^3$ is produced.

During this procedure a part of the air contained in the uncompacted pouring is removed from the pourable powder and vented. Depending on the initial powder density of the mixture, compacting ratios of around 1:1.5 to 1:3 can be required. As there are usually large amounts of powder to be treated, the process is preferably carried out continuously.

A suitable device for carrying our the method of the invention comprises a screw extruder having first and second cylindrical portions connected by a frusto-conical portion, wherein the pitch of the screw is constant, the ratio of the inside diameters of the first and second cylindrical portion is from 2.5:1 to 1.5:1 and the taper of the frusto-conical portion is from 10° to 35°.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a cross-sectional view in elevation of an apparatus for performing the process of this invention;

FIG. 2 is a developed projection of part of the conical section of the cylindrical and conical housing of the apparatus shown in FIG. 1; and FIG. 3 is a cross-sectional view taken through FIG. 2 along the line 3—3.

The device is further illustrated in FIGS. 1 to 3. FIG. 1 is a section through the device, FIGS. 2 and 3 show details of construction. The numerals illustrate: 2 suspension arrangement, 3 funnel-shaped storage tank, 11 rotational axis, 12 axle arm, 13 driving pulley, 14 bearing, 15 ring nun, 17 impeller, 16 cylindrical screw zone I, 16a conical zone, 17 cylindrical screw zone II.

A support 11 is suspended from the traverse member 2. The support 11 is driven at its upper free end 12 by a drive wheel 13. Below the bearing 14, the support 11 is axially displaceable by means of a threaded ring 15. In addition, the support 11 is provided, before the beginning of the screw zone 16, with staggered stirrer blades or vanes 7 whch are mounted for displacement perpendicularly of the axis of the support and for rotation about their own axis. Below the stirrer blade or vane 7 the support 11 continues in the form of a screw in such a way that a cylindrical-conical section 16, 16a is followed by another cylindrical section 17. It is also possible to use a purely conical section instead of a cylindrical-conical section 16, 16a. The housing is provided on its inside, in the vicinity of the conical section 16a with fillets 18 (see FIGS. 2 and 3) which extend at an angle to the generatrices of the conical section of the housing.

The upper part of the device serves as a feeding device for the pulverised mixture. It es essentially a funnel with impellers, in the vertical arrangement of the device as shown. Of course the device can also be horizontally arranged. In this case the filling device is a funnel which rests laterally on the screw. In the funnel conveying means can be arranged to prevent channelling. The essential elements of the device are 16, 16a and 17. Requirements here are a uniform pitch and depth of the screw over its whole length, a ratio of the diameter of the cylindrical screw zone I to cylindrical screw zone II from 2.5:1 to 1.5:1, an angle of taper of the conical screw zone from 10° to 35°, and a length ratio of the cylindrical zone I to the cylindrical zone II of 0.5:1 to 2:1. The inner wall of the screw housing can contain ridges for improving conveyance and output, as represented in FIGS. 2 and 3 (reference number 18). It is also possible to provide separate cooling and heating devices for the different screw sections.

We claim:

1. A method for the compaction of a vulcanisable rubber mixture consisting of rubber and additives including a vulcanising medium in the form of a pourable powder having a particle size of from 0.1 to 6 mm and a density of from 0.4 to 0.8 g/cm$^3$, wherein the mixture is passed through a continuously decreasing cross-section at a temperature of from 0° to 60° C., whereby a granular, compact, yet not completely homogeneous mixture having a density of from 1.1 to 1.4 g/cm$^3$ is produced.

* * * * *